(12) United States Patent
Valcher et al.

(10) Patent No.: US 7,234,970 B2
(45) Date of Patent: Jun. 26, 2007

(54) SMART CARD CONNECTOR WITH FRAUD PROTECTION

(75) Inventors: Fabrice Valcher, Dole (FR); Olivier Masson, Dole (FR); Patrick Daubigney, Authume (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/219,613

(22) Filed: Sep. 2, 2005

(65) Prior Publication Data

US 2006/0073735 A1    Apr. 6, 2006

(30) Foreign Application Priority Data

Sep. 7, 2004   (FR) .................................. 04 51975

(51) Int. Cl.
*H01R 24/00* (2006.01)

(52) U.S. Cl. ...................................... 439/630; 439/136

(58) Field of Classification Search ............... 439/607, 439/360, 135–138, 142, 630, 631, 92, 95
See application file for complete search history.

(56) References Cited

U.S. PATENT DOCUMENTS 5,872,332 A * 2/1999 Verma ..................... 174/59
6,354,881 B1   3/2002 Bricaud et al.
6,390,850 B2 * 5/2002 Yoshimura et al. ......... 439/607
2004/0248467 A1 * 12/2004 Herlitz et al. ............... 439/607

FOREIGN PATENT DOCUMENTS

EP            0 996 102 A1    4/2000
WO         WO 98/52139      11/1998

* cited by examiner

*Primary Examiner*—Felix O. Figueroa
(74) *Attorney, Agent, or Firm*—Peter Van Winkle

(57) ABSTRACT

A smart card connector with signal blade contacts having signal tails (34*a*) lying at the rear end of the connector frame, and with the connector being provided with a shield structure (110) that prevents a person from fraudulently contacting the signal tails during use of the connector. The shield structure includes a grounded conductive shield (40) having a rear portion that lies rearward of the signal tails. The conductive shield is mounted on an insulative barrier (60) that has a front portion (112) lying over the signal tails during use of the connector. The insulative barrier is pivotally mounted on the frame, between an open position wherein the shield structure leaves a region above the signal tails exposed during soldering, and a protect position wherein the shield structure blocks a region above and rearward of the signal tails.

3 Claims, 9 Drawing Sheets

SMART CARD CONNECTOR WITH FRAUD PROTECTION

CROSS-REFERENCE

Applicant claims priority from French patent application 0451975 filed Sep. 07, 2004.

BACKGROUND OF THE INVENTION

Smart cards, which are about the size of a credit card or smaller and that have contact pads on their lower surfaces, contain memory chips that are read out or written into by smart card connectors. A common type of smart card connector has a card-receiving slot open at its rear end, into which a card can be forwardly inserted, until the card is fully inserted and blade contacts engage the card pads. The connector is mounted on a circuit board, with the contacts having tails soldered to traces on the board. Most contacts are signal contacts that carry signals, and usually one contact is a ground contact.

The contact pads are usually arranged in two rows, including forward and rearward rows, and the blade contacts are usually arranged in two rows including forward and rearward rows. The blade contacts of the forward row extend to the front end of the connector where their tails are soldered to circuit board traces, and the blade contacts of the rear row extend to the rear end of the connector where their tails are soldered to circuit board traces. It is highly desirable that a region above the tails be open during and immediately after soldering, to enable inspection of the solder joints.

Smart card connectors that are used in public places, and especially when unattended, are subject to fraud attempts. One type of fraud attempt involves inserting a conductor from a position at the rear of the card connector slot, in an attempt to contact one of the signal contacts and apply a voltage to it while a card lies fully inserted in the slot (the connector senses when a card has been fully inserted and will not operate until then). It would be useful if the signal tails lying at the rear of the connector were protected from engagement with a conductor inserted by an unauthorized person, especially from a voltage (above or below ground potential) that such conductor carried, while leaving a region above the signal tails open during soldering operations.

SUMMARY OF THE INVENTION

In accordance with one embodiment of the invention, a smart card connector is provided with a slot having an open rear end for receiving a smart card, and with signal blade contacts having rear ends forming signal tails that are soldered to traces on a circuit board. The invention provides a shield structure that shields the signal tails against engagement with a fraudulently inserted conductor, especially one carrying a voltage (above or below ground), and yet allows free access to the signal tails though a region above the signal tails during soldering operations when the tails are soldered or otherwise electrically joined to traces on a circuit board. During operation of the connector, the shield structure blocks areas behind and above the tails.

The shield structure includes a sheet metal electrically conductive shield with a rearward portion that lies rearward of the signal tails, to block easy access to the signal tails from the rear. The conductive shield is connected to a ground trace on the circuit board. Thus, even if a conductor is projected around or though a gap in the sheet metal shield, such conductor will be grounded if its also touches the conductive shield.

The shield structure also includes an insulative barrier which has a front end that lies over rear portions of the signal blade contacts including the signal tails. The conductive shield is mounted on the insulative barrier, and the two of them are pivotally mounted on the connector frame to pivot between open and shielded positions. In the open position, the region above the signal tails is open for soldering and solder inspection. In the shielded position the shield structure closes the area behind and above the signal tails. A latch latches the shield structure in the shielded position when moved to it.

The novel features of the invention are set forth with particularity in the appended claims. The invention will be best understood from the following description when read in conjunction with the accompanying drawings.

DESCRIPTION OF THE PREFERRED EMBODIMENTS

1. Limited Description of the Invention

Figure 1:
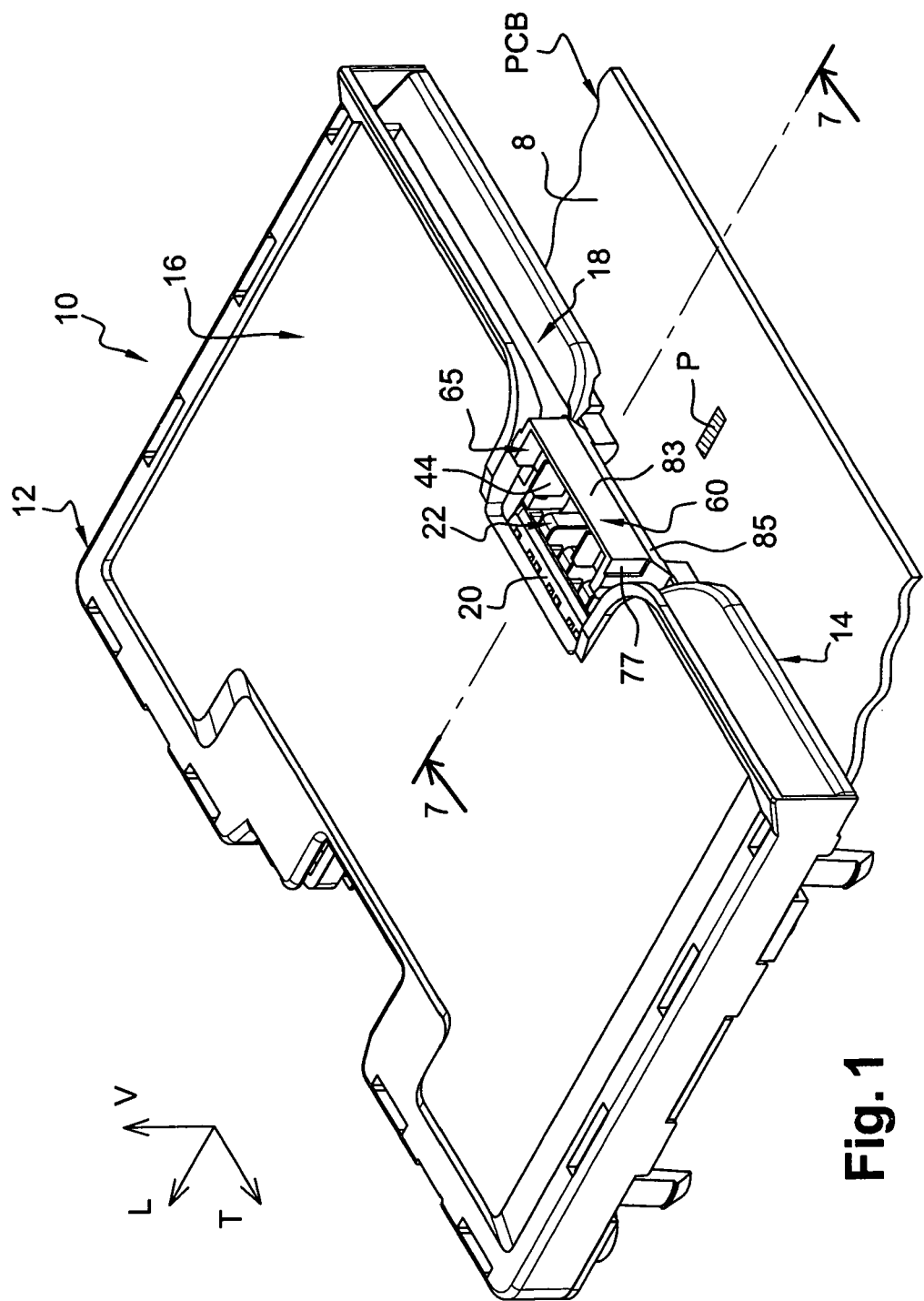
FIG. 1 is an exploded isometric view of a smart card connector and of a portion of a circuit board on which the connector is to be mounted, and with a shield structure in its open position.

FIG. 1 illustrates a smart card connector 10 which includes a molded frame or body 12 of insulative material such as plastic, and which is designed to be mounted on a printed circuit board PCB. The circuit board has an upper face 8 with conductive traces thereon, and with an earth or grounded trace P shown in the figure. The frame or case 12 includes lower and upper plates 14, 16 and forms a slot 18 between them. The slot is designed to receive a memory card, often referred to as a smart card, by the card being inserted in a forward direction F into the slot. Such card has contact pads on its lower surface, which are engaged with eight electrical contact blades, or blade contacts 22 of the connector when the card has been fully inserted into the connector. Most of the blade contacts are signal contacts that carry signals (potentials that vary and that are above and/or below ground).

The contact blades are arranged in front and rear rows, each row extending transversely T, and the rows being spaced apart in longitudinal directions L. Each blade contact has a pad-engaging portion that extends vertically V above the upper face of the lower plate 14 and that is depressed by the card. Each blade contact also has a connection end, or tail that is soldered to a trace on the circuit board. All eight of the blade contact are identical. The forward row of four blade contacts have their tails lying in a front recess or cutout 100 at the front end of the connector frame 14. The rearward row of four blade contacts have their tails lying in a rear cutout 64 at the rear of the frame.

The rear end 102 of the connector must be accessible to a person who is to insert a smart card into the slot 18. Where the connector is unattended and people insert their own cards into the slot, there is a possibility that a dishonest person will try to commit fraud. One way for a person to try to commit fraud is to contact one or more of the blade contacts with a conductor that may carry a signal, to see if that signal is picked up by read circuitry that is connected to the connector. The connector will not operate unless sensors detect full insertion of a card in the slot, and the top face of the circuit board rearward of the connector is covered, so a person may try to insert the conductor into the rear cutout 64 to try to contract a blade contact tail.

Figure 3:
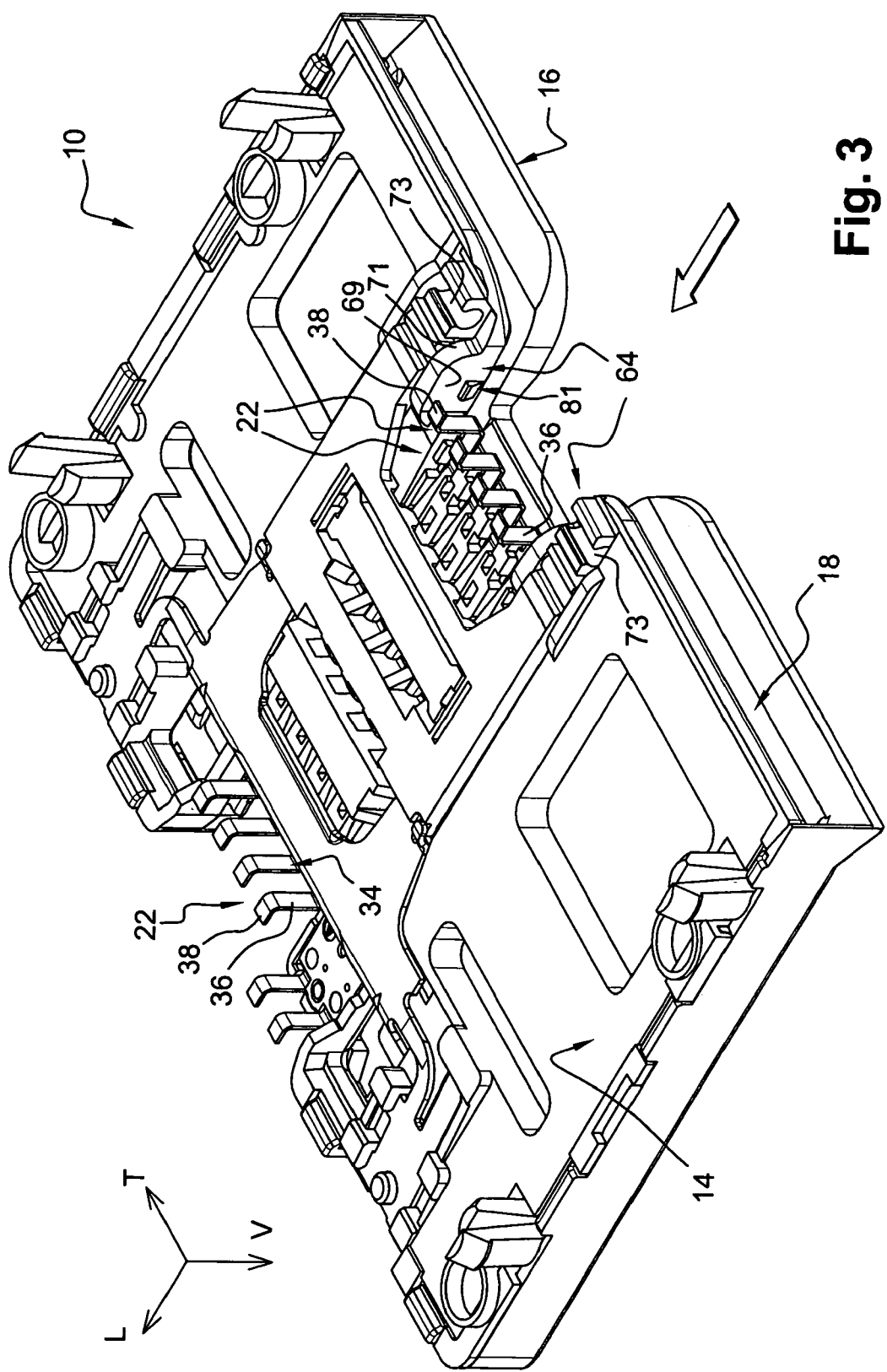
FIG. 3 is a bottom isometric view of the connector of FIG. 1, but without the shield structure.
Figure 6:
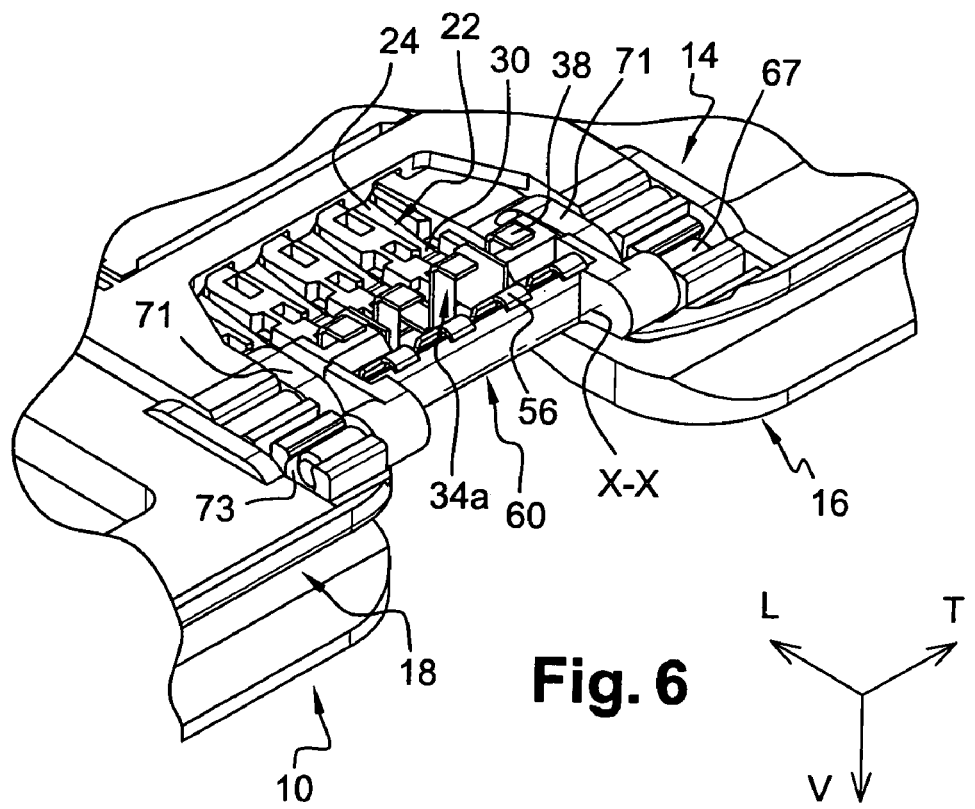
FIG. 6 is a rear bottom isometric view of the area shown in FIG. 5.
Figure 7:
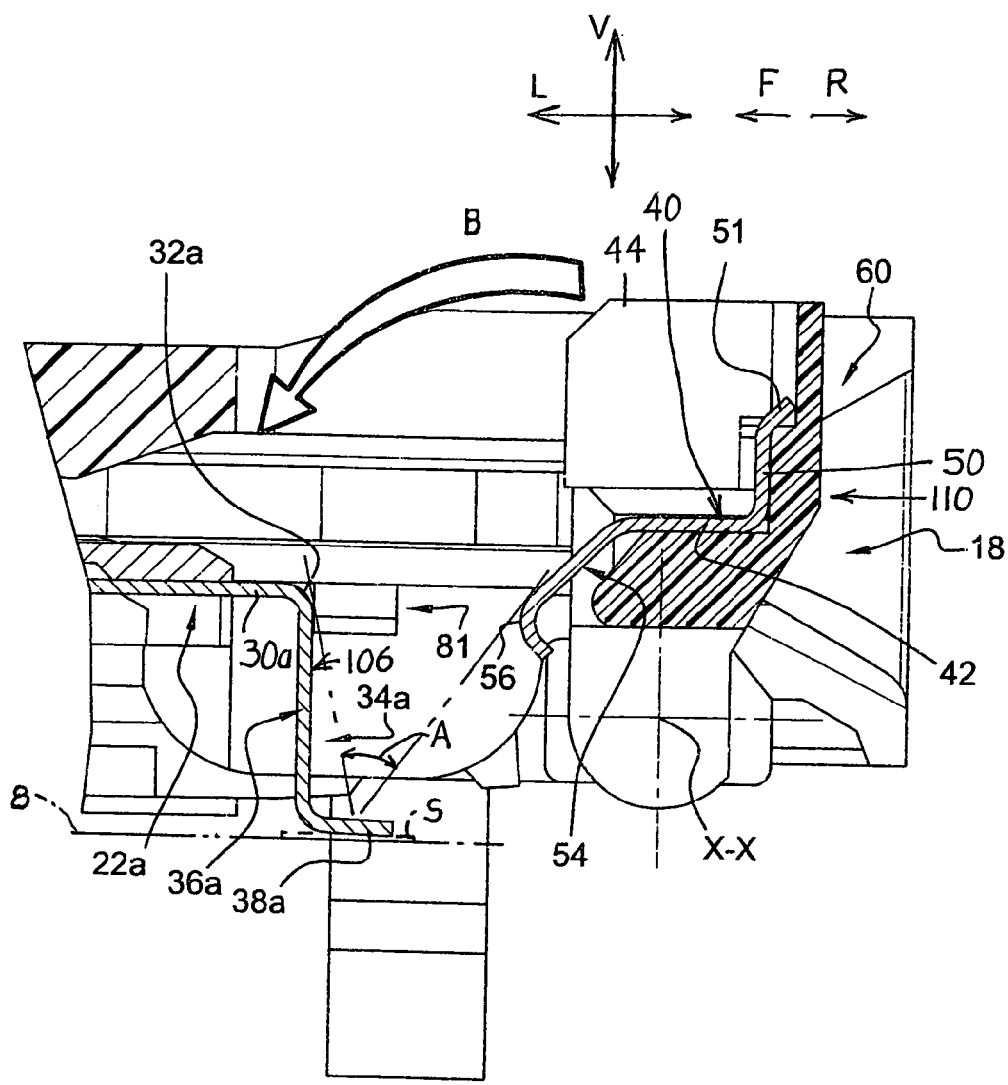
FIG. 7 is an enlarged sectional view taken on line 7-7 of FIG. 1, with the shield structure also shown in its open position.

FIG. 6 shows that each contact tail 34a of a rear group of blade contacts has a primarily horizontal (when the card-receiving slot 18 is horizontal) rear portion 30 or 30a (FIG. 7). Each contact has a 90° bend 32a leading to a vertical part 36a of the tail, and another 90° bend leading to a horizontal branch 38a which is intended to be soldered to the circuit board (usually to a signal trace S on the upper face 8 of the circuit board). As shown in FIG. 3, the rear portions 106 of the blade contact which lie rearward of a rear edge 104 in the cutout of the frame lower plate 14, are the contact portions that are most vulnerable to fraudulent engagement by a conductor.

Figure 2:
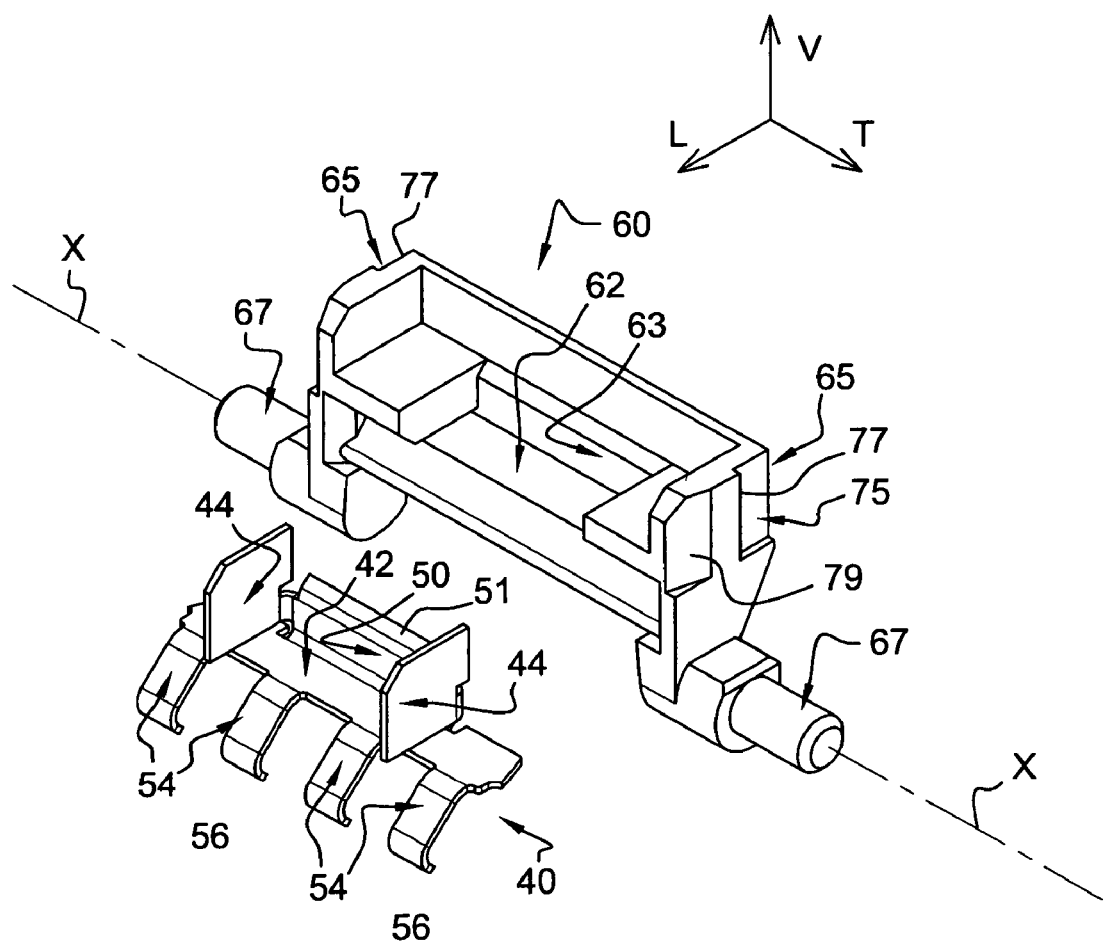
FIG. 2 is an enlarged and exploded front and top isometric view of the conductive shield and the insulative barrier of the shield structure of FIG. 1.

In accordance with the present invention, applicant provides a shield structure 110 (FIG. 8) which covers the contact blade rear portions 106 to prevent fraudulent insertion of a conductor device against the contact rear portions. The shield structure includes a metal cage formed by a sheet metal shield 40 and an insulative support or barrier 60. As shown in FIG. 2, the sheet metal shield includes a protective plate 42 and transversely opposite vertical plates 44. In the protecting position of the sheet metal shield shown in FIG. 8, a horizontal part 50 of the shield lies over the blade contact horizontal branch 38a, a vertical part 42 of the shield lies rearward of the blade contact tail, and end parts 56 of the shield lie rearward of and extend below the contact tail. The end parts 56 are intended to engage ground traces on the circuit board by pressing against them, and usually without soldering to them.

The insulative barrier 60 has a front top plate 63 (FIG. 8) with a front end 112 that lies closely over the top horizontal part of the contact blade rear portion 106 to protect it. The barrier front end 112 has a front edge that abuts the rear end of the frame lower plate 14 to resist the insertion of a conductor. Applicant uses the term abut to mean that the parts are at least as close as the thickness of the barrier front plate front end 112. The barrier front plate 63 has parts that lie over the plates 50,42 and part of the fingers 56 of the sheet metal shield to cover gaps between adjacent fingers or end parts 56. The bottom of the barrier lies above the rear finger parts that engage the circuit board. The end parts 56 extend rearward of the barrier plate.

The shield structure 110 is supplied by the manufacturer of the connector, to the company that will mount the connector on a circuit board, with the shield structure in a raised, initial position as shown in FIG. 1. As shown in FIG. 7, in the raised position, the rear portions 106 of the contact blades are exposed. This allows access to the blade contact tails if they are to be soldered by infrared beam welding or other means that requires direct access to the tails, and provides access to check that good solder joints have been established by visual inspection and by touching the contacts with probes to check resistance, etc. The access space covers an area subtending an angle A of more than 10 degrees and preferably at least 30 degrees, as measured from the middle of the blade contact horizontal section 38a, as seen in the sectional view of FIG. 7.

After soldering has been completed and inspected and/or tested, the shield structure 10 is pivoted forward and downward as indicated by arrow B. The shield structure is pivoted approximately 90° about transverse axis X-X to the position shown in FIG. 8. During such pivoting, the end part 56 of the sheet metal shield is deflected upward as it wipes against a ground trace on the circuit board. When the shield structure reaches its protecting position, latches (81 in FIG. 3) on transversely opposite sides of the frame cutout, engage corresponding latches in the form of notches 77 (FIG. 2) on the insulative barrier. FIG. 9 shows the latches engaged with one another. Thereafter, the shield structure cannot be pivoted up from its protecting position.

FIG. 7 shows that when the shield structure 110 lies in its initial unprotecting position, its blocks a region immediately behind the card-receiving slot 18. If the technician who is installing the connector forgets to pivot the shield structure to the protected position, this will be immediately discovered because a card cannot be inserted into the slot until the shield structure has been pivoted down. FIG. 2 shows that the insulative barrier has trunnions or shafts 67 that lie in recesses 73 (FIG. 3), and the insulative barrier has flanges 65 (FIG. 2) that lie transversely beyond the opposite vertical plates 44 of the sheet metal shield.

Figure 12:
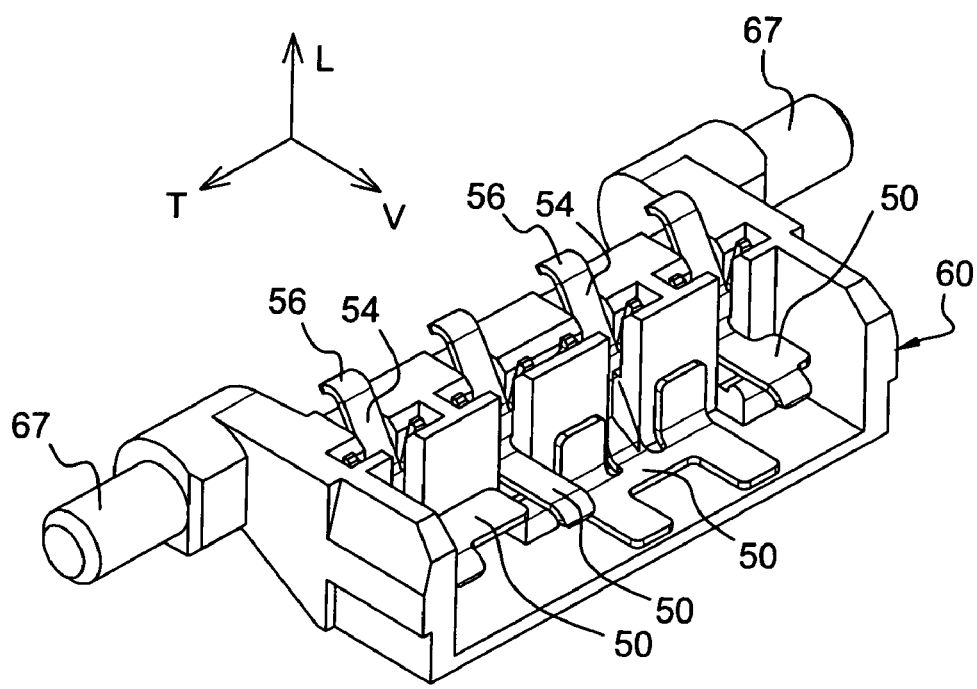

FIGS. 10-13 illustrate another embodiment of the invention, wherein the sheet metal shield (40A in FIG. 13) is formed of three separate sheet metal shield parts 50A that each protects one or two blade contact tails and that are each connected to ground by a separate shield end part 56. The shield of FIGS. 10-13 does not include end plates similar to those 44 of FIG. 2. FIG. 12 shows the shield parts mounted on an insulative barrier 60A.

It is possible for the shield structure to be initially mounted rearward of the desired empty space over the tail and to slide largely forward to a position over such space. It is possible for the shield structure to be an item that is attached to the connector frame after soldering is complete, but this results in a separate small item to be supplied by the connector manufacturer, which could be lost.

While terms such as "top", "down," etc. have been used to describe the invention as illustrated, it should be understood that the invention can be used in any orientation.

Thus, the invention provides a shield structure that resists fraudulent attempts to engage signal blade contacts by a conductor device inserted into the rear of the connector. The shield structure includes an insulative barrier that blocks a region rearward and above the tails of rear blade signal contacts of the smart card connector. The shield structure also includes a grounded metal shield that has portions that lie behind the blade contact tails, to ground any inserted conductor device that touches the metal shield. The metal shield is mounted on the insulative barrier. The shield structure is pivotally mounted on the frame of the connector, to pivot between an unprotecting position wherein a region above the tails is exposed to viewing and probe contacting, to a protected position wherein the shield structure closes the region above and behind the blade contact tails.

2. Detailed Description of the Invention

In the description that follows, identical, similar or analogous components will be denoted by the same reference numerals.

Without implying any limitation, to make it easier to understand the description and the drawings the terms "vertical", "horizontal", "lower", "upper", "top", "bottom", "transverse", "longitudinal", etc. will be adopted with reference to the reference frame L, V, T indicated in the figures.

FIG. 1 shows a connector 10 consisting essentially of an insulating plastic body or case 12 produced by moulding.

The general design of the connector 10 with its insulating body 12 is here of the type described and shown in the documents WO-A-98/52139 and U.S. Pat. No. 6,354,881.

The connector 10 is shown placed above a printed circuit board PCB that has, on its upper face 8, many conducting contacts, only one P of which is illustrated, this being the "earth" track within the context of the invention, that is to say a track forming part of an earth circuit of the read/write device (not shown) to which the connection assembly 8-10 belongs.

The case 12 essentially consists of a lower horizontal plate 14 and an upper horizontal plate 16 which between them define a longitudinal slot 18 for the forward insertion, from the rear, along the direction indicated by the arrow "F" in FIG. 1 of a memory card (not shown) that includes, on its lower face oriented so as to be opposite the upper facing face 20 of the lower plate 14, conducting pads placed in a standardized fashion.

In its central part, along the transverse direction "T", the lower plate 14 constitutes the contact-bearing insulating block of the connector 10 which bears, in a known fashion, two groups of four electrical contact blades 22.

The general design of the contact-bearing block with its blades is for example described and shown in detail in the abovementioned documents. All the contact blades here are identical.

Each contact blade 22 includes a substantially horizontal branch 24 that has a convex curved first end (not shown in the figures) called the "contact" end intended to cooperate with a corresponding pad on the card.

The free contact end is capable of projecting, vertically upwards, from the horizontal plane of the upper plane face 20 of the insulating lower plate 14 when the card is at the end of insertion travel, as described in the abovementioned two documents.

The blade 22 includes a rear portion 30 that terminates in a second end, called the connection end or tail, which is in the form of a right-angled connection tab 34 which allows the blade 22 to be electrically connected to a corresponding conducting track (S, FIG. 7) formed on the upper face 8 of the printed circuit board PCB.

The connection tab includes here a vertical branch 36 (FIG. 3) that extends, from the rear end of the central connecting portion 30, downwards, so as to be approximately level with the lower horizontal face 21 of the insulating block 14.

The connection tab 34 also includes a horizontal branch 38 that extends the vertical branch 36, starting from its lower end, horizontally towards the rear and lying slightly below the plane of the lower face 21.

The connection tabs 34, each with a horizontal branch 38, are therefore in this case of the type to be reflow-soldered to corresponding conducting tracks on the upper face 8 of the printed circuit board PCB.

As may be seen in particular in FIG. 3, in the absence of means according to the invention for protection against breaching, it is possible for the contact blades, and especially the connection tabs 34 of the blades, to be easily reached.

The abovementioned documents, which illustrate a connector according to the prior art with no protection means, themselves illustrate the ease with which a break-in can be attempted.

The invention aims to preferentially protect at least one of the contact blades 22, which in this case is a signal blade 22a called the IO blade, the design of which is in every point analogous to those of the seven other blades of the connector, and therefore analogous to that which has just been described in detail.

In the figures and the rest of the description, the I/O contact blade protected according to the teachings of the invention (and all its parts) will be denoted by the same reference numerals as the other blades, but with the letter "a" as suffix.

If it is desired to protect the contact blade 22a against any attempt at break-in, it is desirable to essentially protect its connection tab 34a with its two branches 36a and 38a.

Figure 4:
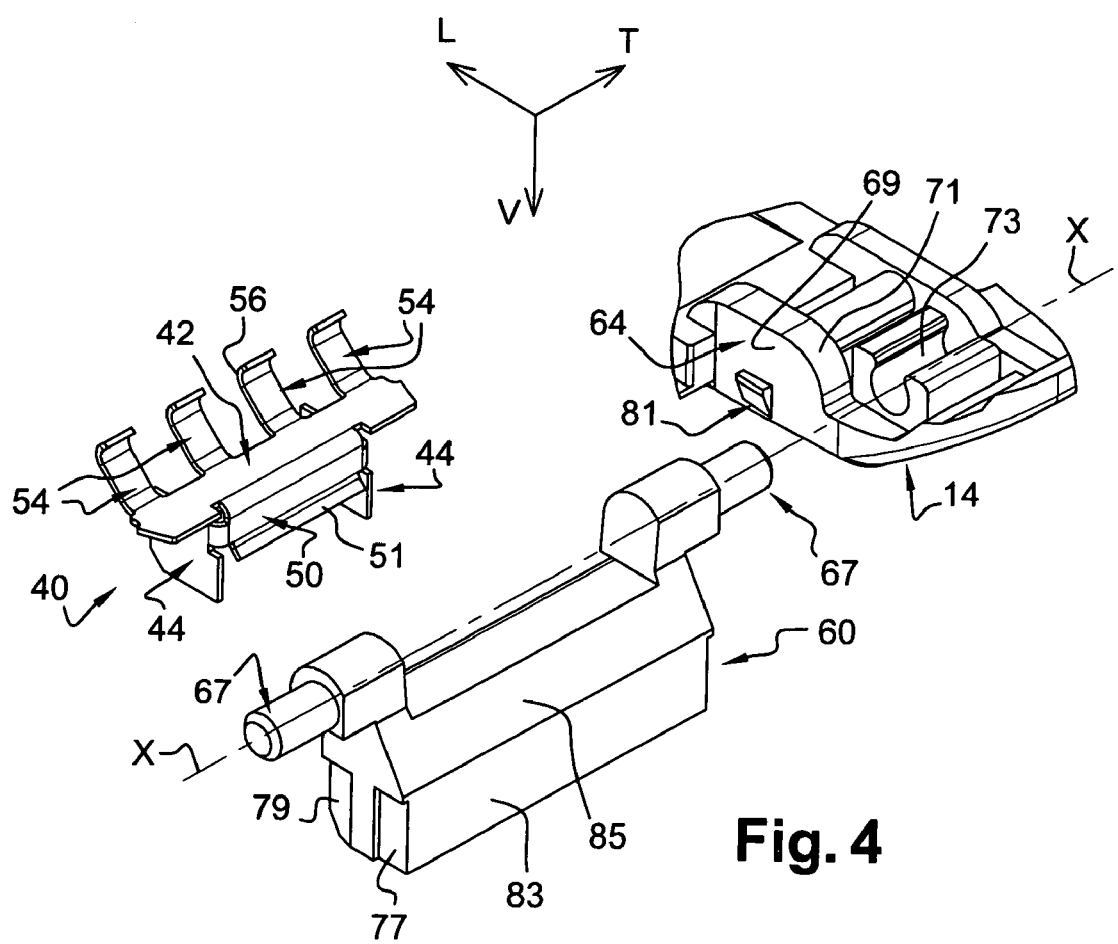
FIG. 4 is a view similar to that of FIG. 2, but with the shield structure parts in a different orientation and showing a portion of the connector frame.

According to the teachings of the invention, this protection is achieved by means of a protective metal shield or cage 40, which is illustrated in detail in FIGS. 2 and 4.

The protective metal cage 40 is made of a conductive metal sheet, cut and folded.

It consists mainly of a first, vertical rear transverse, protective plate 42 and two opposed lateral vertical longitudinal plates 44 that are joined together by a horizontal upper plate 50.

Figure 8:
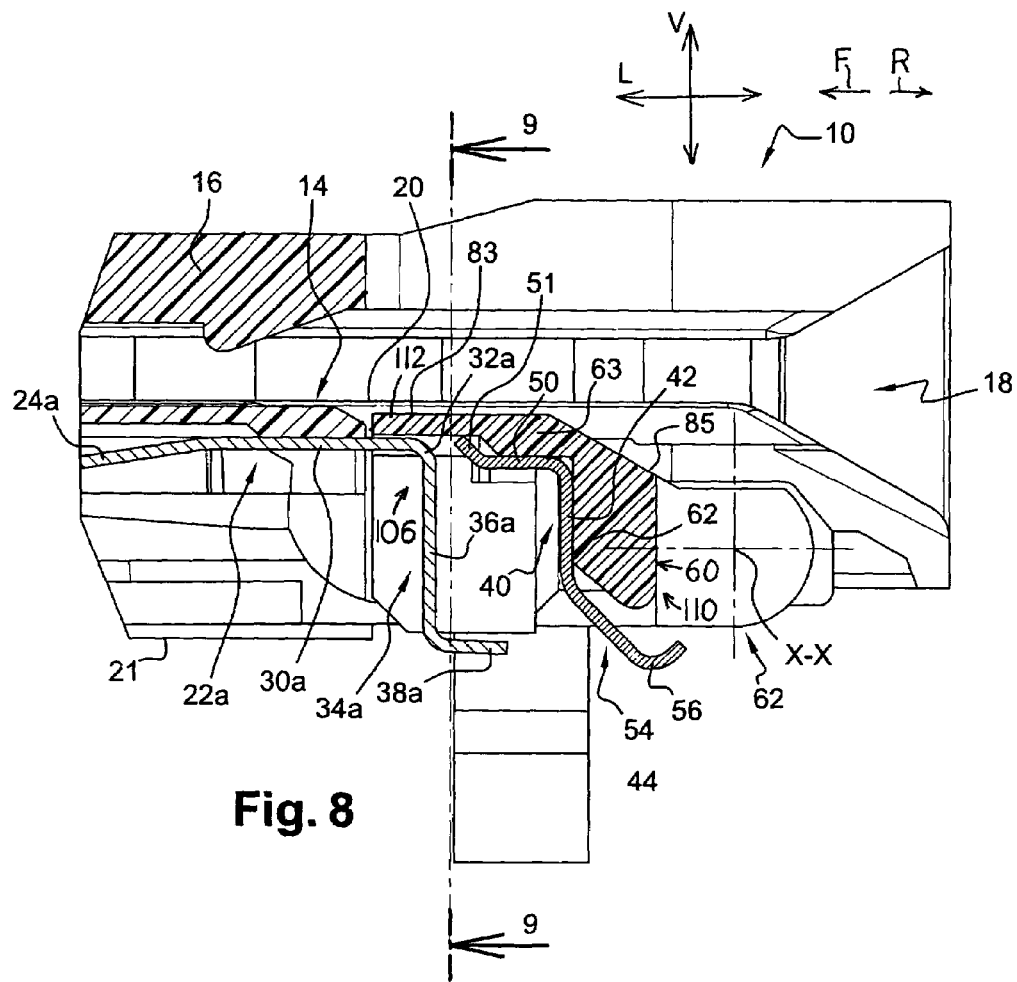
FIG. 8 is a view similar to that of FIG. 7, but with the shield structure in its shielding position.
Figure 9:
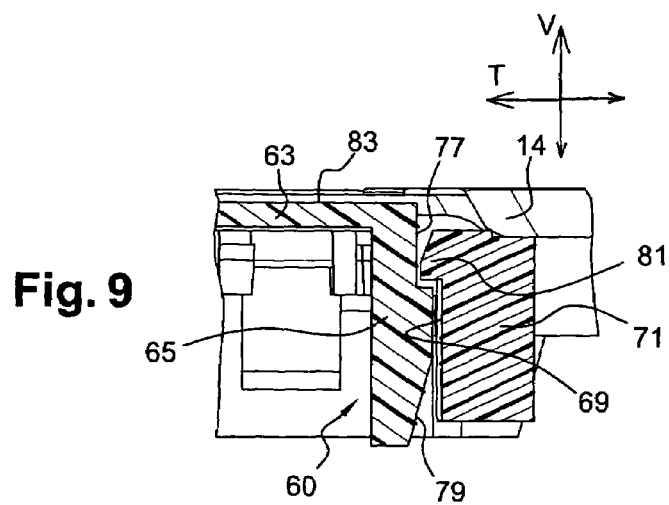
FIG. 9 is a sectional view taken on line 9-9 of FIG. 8.
Figure 10:
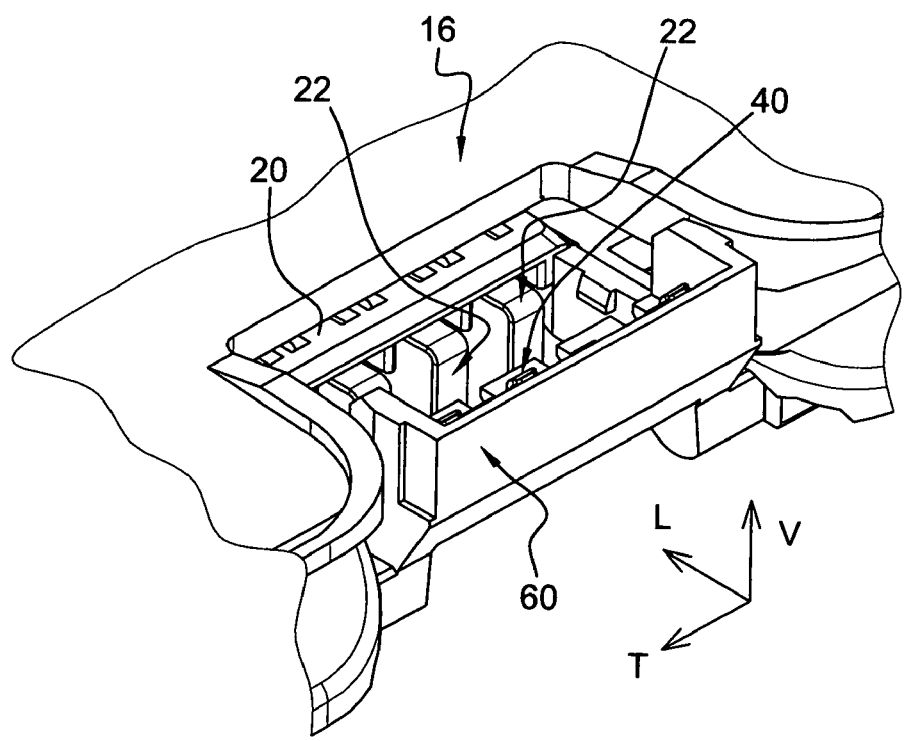
FIGS. 10 to 13 are views of an alternative embodiment of the invention.
Figure 11:
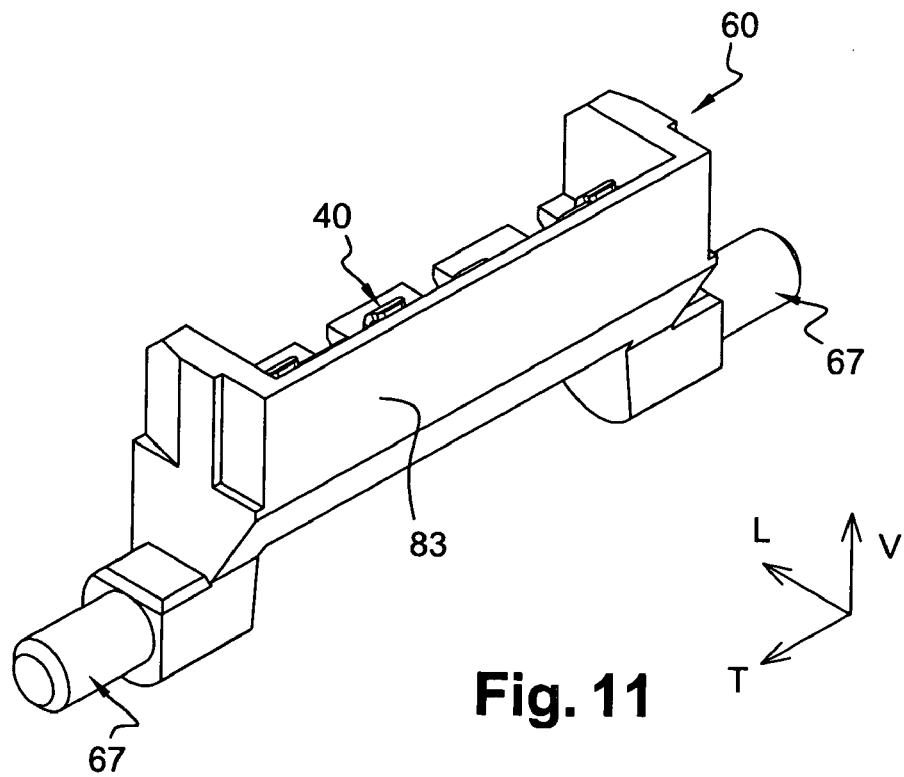

In the mounted position of the protective cage 40 in the insulating block 14 of the connector 10, as may be seen in particular in FIG. 8, the transverse first protective plate 42 extends vertically downwards from the horizontal plate 50 substantially from the horizontal plane of the central connecting portion 30 and over a height slightly less than the height of the vertical branch 36a of the connection tab 34a.

Given the transverse width of the plate 42, this extends opposite not only the signal blade 22a but also another blade 22 immediately adjacent thereto.

As may be seen in FIGS. 2 and 3, the longitudinally oriented lateral vertical plates 44 are of substantially square outline and extend substantially over the entire height of the connection tab 34a, having the function of laterally protecting both the vertical branch 36a and the horizontal branch 38a, along their two opposed longitudinal sides.

The horizontal protective metal plate 50 of the cage 40 extends horizontally substantially in the plane of the central connecting part 30a and lies above the horizontal branch 38a of the connection tab 34a (said plate being offset vertically upwards).

The horizontal plate 50 extends longitudinally towards the front in the direction of the right-angle bend 32a, where the vertical branch 36a joins with the connecting portion 30a, and is bounded by a curved front edge 51 that is close to the right-angle bend 32a without however, of course, being in electrical contact with the latter.

The vertical protective plate 42 (FIG. 8) is extended transversely on either side of the lateral plates 44 and thus extend opposite all the vertical branches of the connection tabs of the four contact blades forming part of the same group (here the rear group).

The horizontal plate 50 extends only between the two lateral plates 44 and it thus protects the connection tab 34*a* and the connection tab 34 of the contact blade 22 immediately adjacent to the signal blade 22*a*.

In line with each of the connection tabs, and more particularly in line with the connection tab 34*a*, the vertical plate 42 is extended vertically downwards and longitudinally rearwards by an inclined extension 54 having substantially the same transverse width as that of the connection tab 34*a*, which inclined extension terminates in a convex curved end portion 56 oriented vertically downwards in the direction of the upper face 8 of the printed circuit board PCB.

As may be seen in FIG. 8, in which the connector 10 is shown before mounting and soldering in the board PCB, the extension 54 extends, with its end 56, downwards below the plane in which the horizontal branches 38 lie, and especially the branch 34*a*, so that, when the connector 10 is mounted on the board PCB, the end 56 bears elastically in contact with a conducting earth track, such as the track P illustrated in FIG. 1.

An earth track P common to all the extensions 54, 56 may be provided.

Figure 5:
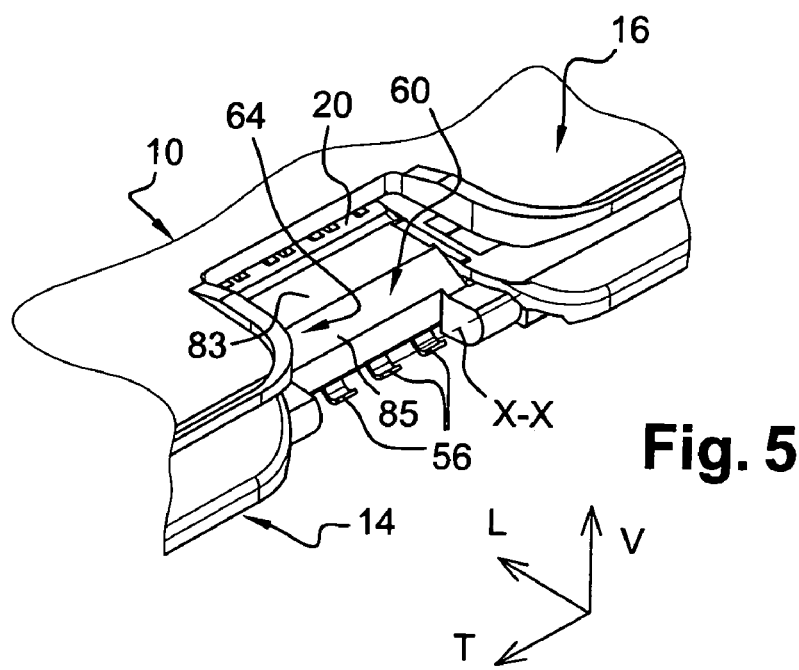
FIG. 5 is a rear isometric view of a portion of the connector of FIG. 1, with the shield structure in its shield position.

As may be seen in particular in FIGS. 5 to 7, the signal blade 22*a* is surrounded by the protective cage 40, and especially by the protective plates 42, 44, 50 and by the extension 56.

Any break-in attempt by means of a conducting element, such as for example a drill, necessarily results, in particular owing to the dimensions of the various components, in an electrical contact being established between the protective cage 40 and the signal blade 22*a*.

This electrical contact results in an earth short-circuit being established between the signal blade 22*a* and the earth circuit.

This short circuit is detected as a signal representative of a break-in attempt.

Even when there is no actual drilling, any break-in attempt by using a hook-up wire, given the very close proximity of the protective plates to the connection tab 34*a*, results in a contact short circuit between these components.

It should be noted in the figures that the protective cage 40 has in fact four extensions 54 with their curved ends 56, each one of which extends opposite a connection tab 34 of a contact blade facing the rear group of four blades that is protected by the protective metal cage 40.

It is therefore not necessarily the extension 54 of the protective plate 42 that is placed facing the branch 34*a* of the signal blade which is itself in contact with an earth track, it being possible for this contact to be made via any of the extensions 54, 56 since the cage is produced as a single component made of conducting material.

According to another feature of the invention, an insulating support consisting of a moulded component made of insulating plastic is provided in order to insulate the protective cage 40 and to be mounted so as to move.

As may be seen more particularly in FIGS. 2 and 4, the barrier or support 60 takes the general form of a vertical plate 62 of substantially rectangular shape, to which the protective plate 42 is adjacent, of a horizontal plate 63, to which the horizontal plate 50 is internally adjacent, and two vertical lateral flanges 65, to which the said plates are joined, each flange bearing a cylindrical articulation pivot 67 that extends transversely towards the outside.

The shapes and the dimensions of the insulating support 60 are such that it fixedly houses the protective cage 40 and are such that the support itself may be housed in the recess 64 (FIGS. 3 and 8) available in the lower slot plate 14 facing the connection tabs 34 of the four blades of the rear contact blade group, and especially between the facing internal faces 69 (FIG. 3) of two downwardly extending vertical lateral cheeks 71 produced by moulding with the lower plate 14.

On either side of each cheek 71, the plate 14 has two cylindrical recesses 73, each of which is designed to house a pivot 67 (FIG. 2), which housings are partially open vertically downwards so as to be able to assemble and mount the support 60 by fitting or "fitting-in" the pivot 67 into the housing 73.

Each lateral flange 65 (FIG. 3) of the insulative support includes, in its external lateral face 75, a notch 77 and a ramp 79, these being arranged so as to make it easier to pivot and lock the insulating support 60.

Complementarily, each internal face 69 (FIG. 3) of a cheek 71 includes a latch in the form of a raised locking peg 81.

As may be seen especially in FIG. 7, the insulating support 60, with its protective cage 40 (mounted by snap-fastening in the support 60) is initially and temporarily mounted, and indexed, in an orientation angularly offset by 90° to its final mounted position for providing a protection function.

In this initial position illustrated in FIG. 7, the connection tabs 34, and especially the connection tab 34*a*, are not protected and are accessible from above the connector, especially so as for example to carry out checking operations on the connector, using probes (not shown) or infrared beam welding operations, or any manual rework.

In this initial assembly position, it may also be seen, especially in FIGS. 1 and 7, that the insulating support 60 constitutes an obstacle to the insertion of a card into the slot 18.

Once the connector 10 has been fastened to the printed circuit board PCB with the lower face 21 bearing on the upper face 8, the insulating support 60 is then pivoted about its pivot axis X-X in the anticlockwise direction indicated by the arrow B in FIG. 7, through one quarter of a turn or 90°, until it occupies the final mounted, and locked, position illustrated in FIGS. 8 and 9.

During this pivoting movement, the curved ends 56 of the protection cage 40 bear elastically, by elastic deformation of the extensions 54, on the upper face 8 of the board PCB, especially with at least one earth conducting track P.

During the pivoting movement, the ramps 79 and the notches 77 pass beyond the pegs 81 (FIG. 3) and ensure angular locking, in the mounted position, of the insulating support 60 and on the protective cage 40, as illustrated in FIGS. 8 and 9.

Should it have been forgotten to intentionally pivot the insulating support 60 in order for it to occupy its final position of providing a protection function, any attempt at inserting a card 18, starting from the position illustrated in FIG. 7, ends up in encountering the obstacle formed by the insulating support 60 and in causing the latter to pivot, if a sufficient force is exerted by means of the card.

In the mounted position illustrated in FIG. 8, it may be seen that the external upper face 83 of the horizontal plate 63 lies slightly below the plane of the upper face 20 of the lower plate 14 and that it is preceded, longitudinally rearwards, by an inclined ramp 85 that helps to facilitate the insertion of a card into the slot 18.

The alternative embodiment illustrated in FIGS. 10 to 13 will now be described.

In this alternative embodiment, the installation of the subassembly formed by the insulating support 60 and the constituent elements of the protective metal cage 40 on the connector 10 are analogous to those described above.

Figure 13:
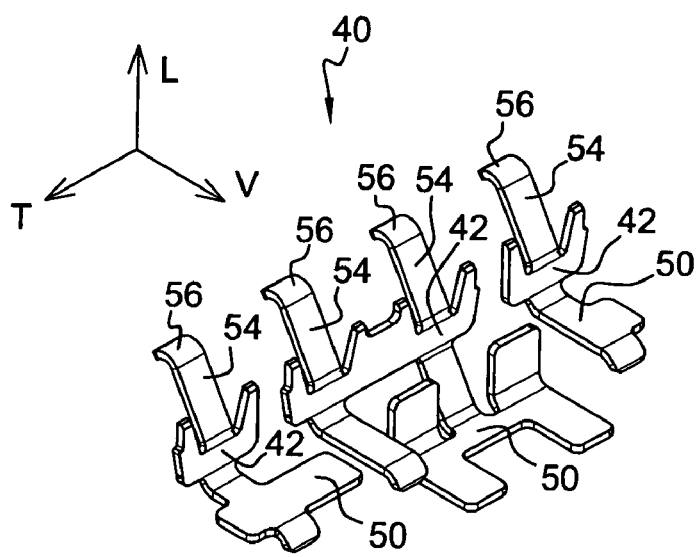

As may be seen most particularly in FIG. 13, which is a perspective view on a large scale of the protective cage 40A, it may be seen first of all that the said cage is made here in the form of three separate metal elements that are all fitted into complementary housings in the insulating support 60A.

Of course, if the cage 40A is made of three elements, each of the elements has to be connected to earth, that is to say to an earth track P, via the end 56 of an extension 54.

The central element illustrated in FIG. 13 simultaneously protects two contact blades 22, whereas each of the two lateral elements illustrated in FIG. 13 protects one contact blade 22.

In this alternative embodiment, it should be noted that the protective cage 40A no longer includes a lateral plate 44.

The application of the invention is not limited to a connector of the contact-landing type described in the abovementioned documents.

Likewise, it is possible to similarly protect both four-blade groups of one and the same connector.

Nor is the invention limited to connection tabs to be connected by reflow soldering, but it may also apply to connection tabs of the type that are inserted into holes in the printed circuit board PCB.

Nor is the invention limited to the design of the electrical contact blades described above, and especially to straight contact blades of the "cantilever" type, rather it can also be applied to the protection of hairpin contact blades.

What is claimed is:

1. A smart card connector for receiving a fully installed smart card, said connector having an insulative frame with a frame face that lies facewise adjacent to said fully installed smart card, and said connector having a plurality of contacts with parts that project vertically beyond said frame face for engaging contact pads of the smart card, wherein the connector is mounted on a circuit board that has a plurality of signal traces and at least one ground trace, and wherein a first of said contacts is a signal contact that has a rear end forming a signal tail that lies exposed at a rear end of said frame and that is connected to one of said signal traces, including:

a shield structure mounted on said connector, said shield structure including a metal shield that has a rearward portion that lies rearward of said tail to block easy access to said tail, and with said metal shield connected to said ground trace on said circuit board, whereby to help block unauthorized projection of a conductor device from the rear of said connector against said tail and to ground such a conductor device; wherein said frame face of said insulative frame lies in a horizontal plane and said insulative frame has a rear end;

said signal contact has a rear portion that lies under said insulative frame and said signal contact has a rear part that extends rearward of an adjacent portion of said insulative frame and that merges with said tail; and including an insulative barrier with a rear portion that lies above said metal shield;

said insulative barrier has a forward barrier part that lies in a protecting position wherein said forward barrier part extends over said rear part of said signal contact rear portion and over said tail, said forward barrier part has an upper face that lies no higher than said insulative frame rear end, and said forward barrier part has a front end that abuts said rear end of said insulative frame.

2. A smart card connector for receiving a fully installed smart card, said connector having an insulative frame that forms a slot with an open rear end for receiving said smart card by forward insertion of the smart card into the slot, said frame having a frame face that lies facewise adjacent to said fully installed smart card, and said connector having a plurality of contacts with parts that project vertically beyond said frame face for engaging contact pads of the smart card, wherein the connector is mounted on a circuit board that has a plurality of signal traces and at least one ground trace, and wherein a first of said contacts is a signal contact that has a rear end forming a signal tail that lies exposed at a rear end of said frame and that is connected to one of said signal traces, including:

a shield structure mounted on said connector, said shield structure including a metal shield that has a rearward portion that lies rearward of said tail to block easy access to said tail, and with said metal shield connected to said ground trace on said circuit board, whereby to help block unauthorized projection of a conductor device from the rear of said connector against said tail and to ground such a conductor device;

said shield structure is moveable from a raised position wherein it blocks said slot and leaves open a space above said signal tail, to a protecting position wherein said shield structure does not block said slot but blocks said space above said signal tail.

3. A smart card connector for receiving a smart card, said connector having an insulative frame with a card-adjacent frame face that lies facewise adjacent to a smart card that has been fully installed, and said connector having a plurality of contacts that project vertically beyond said frame face for engaging contact pads of said smart card that has been fully installed, wherein the connector is constructed for mounting on a circuit board that has at least one signal trace and at least one ground trace, and wherein at least one of said contacts is a signal contact that has a rear end forming a tail that lies at a rear end of said frame and that is designed to connect to said signal trace, including:

a shield structure for shielding said signal tail, said shield structure being moveably mounted on said frame to move between an initial position wherein the rear end of said signal tail is exposed through a primarily vertical space subtending an arc of more than 10° upward from a bottom of said tail and a protected position wherein said shield structure has portions lying above and rearward of said signal tail and blocks access to said signal tail from above and through said space and from the rear of said connector;

said shield structure including an insulative barrier and a sheet metal shield mounted on said insulative barrier, said insulative barrier being mounted on said frame;

said insulative barrier having a forward barrier part that extends forward of said sheet metal shield and over said signal tail.

* * * * *